Nov. 6, 1956 J. J. GOODRICH ET AL 2,769,528
CONVEYOR MEANS HAVING PUSHER FINGERS RAISABLE
AT SELECTABLE INTERVALS
Filed March 19, 1954 7 Sheets-Sheet 5

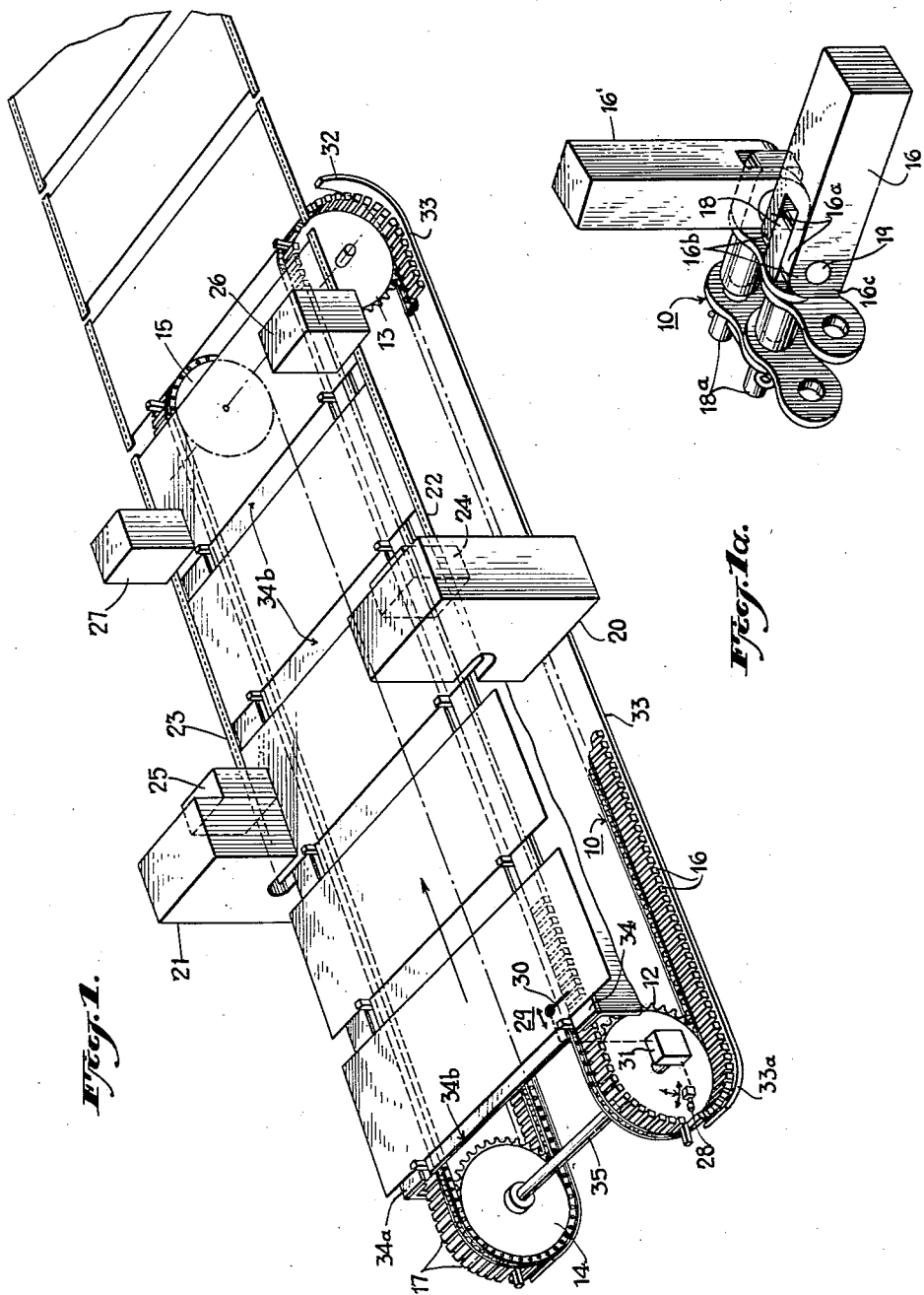

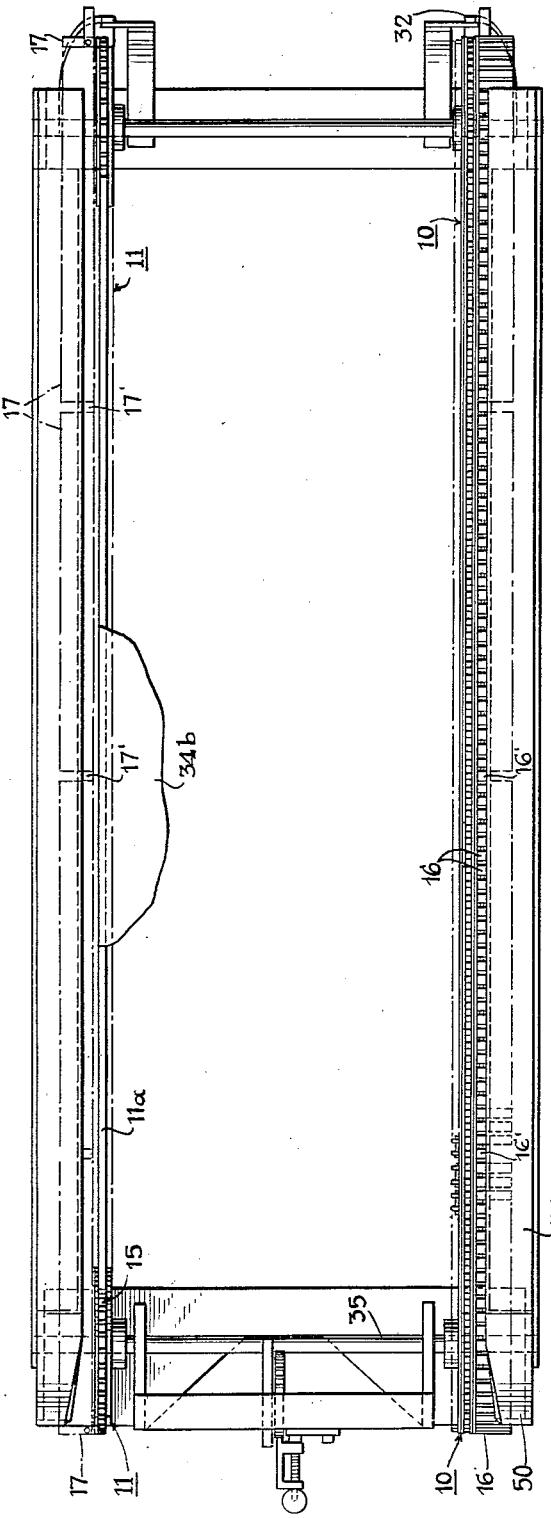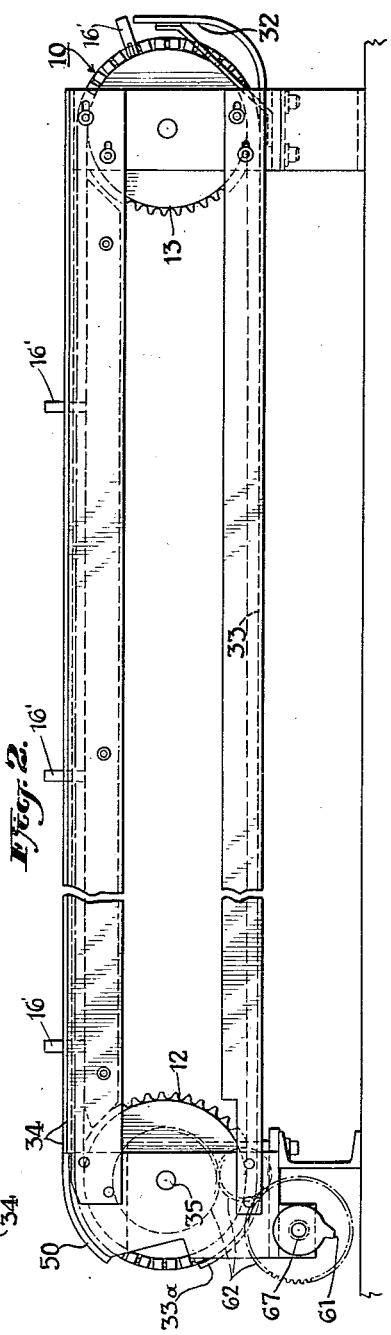

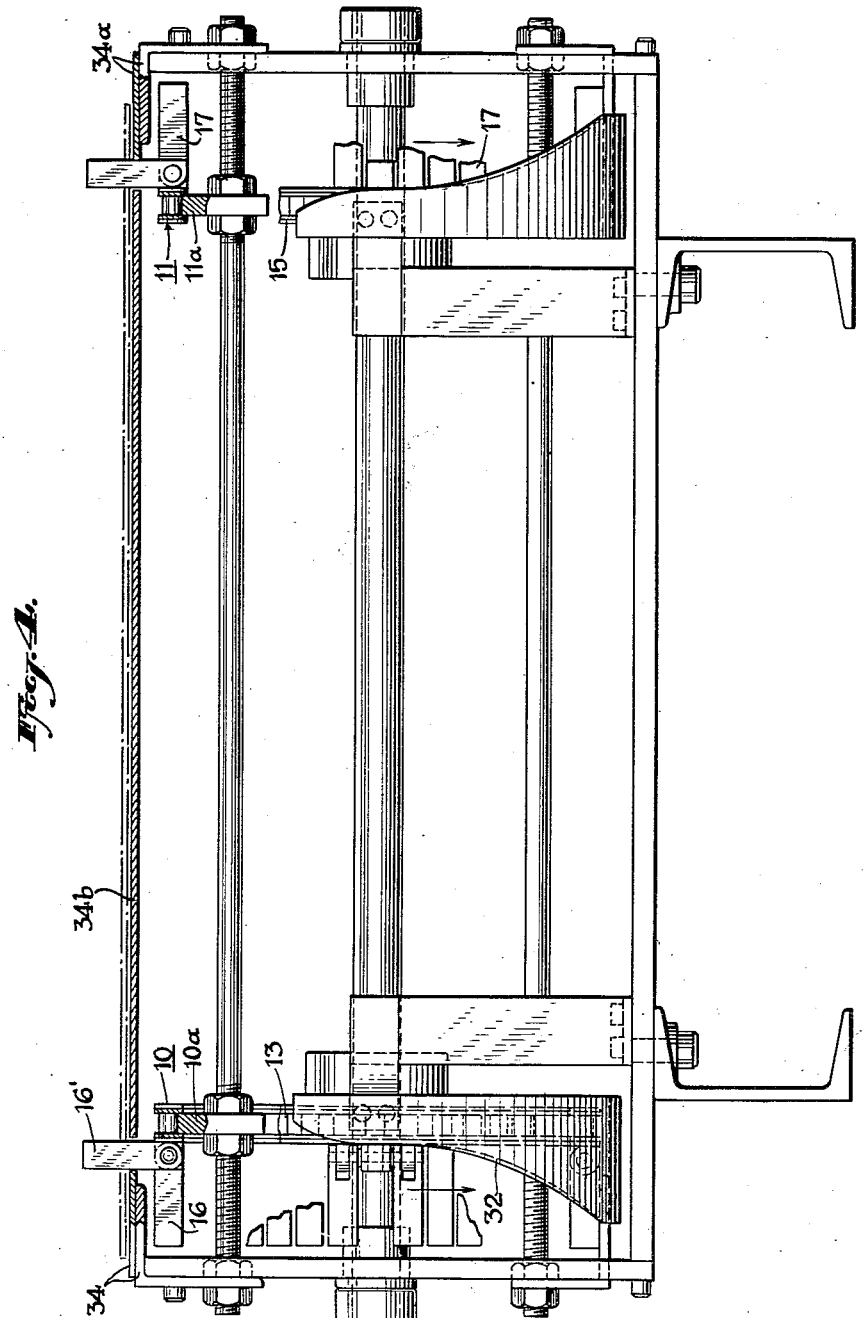

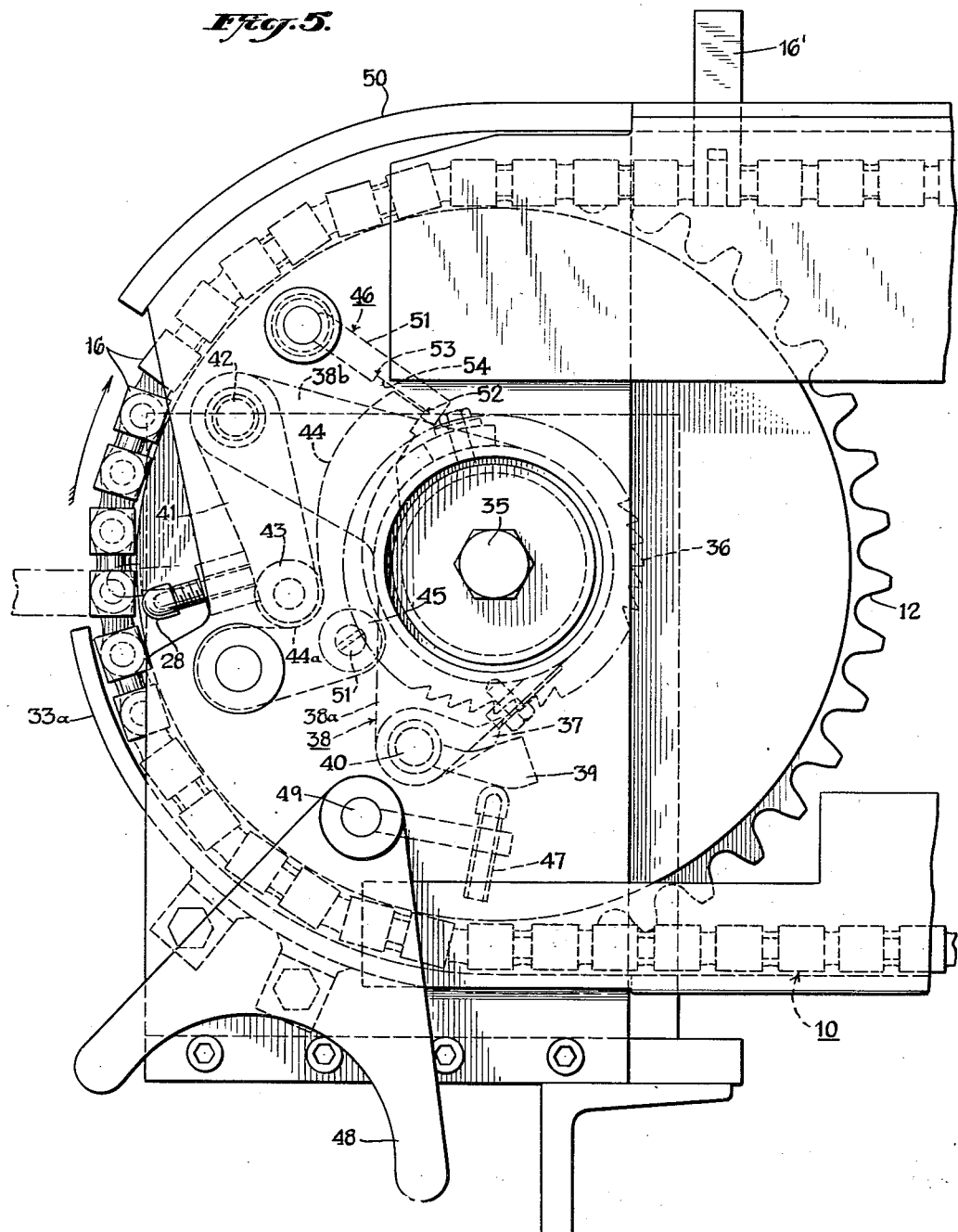

INVENTORS.
JOHN J. GOODRICH.
RICHARD C. ROETGER.
BY
ATTORNEYS.

Nov. 6, 1956  J. J. GOODRICH ET AL  2,769,528
CONVEYOR MEANS HAVING PUSHER FINGERS RAISABLE
AT SELECTABLE INTERVALS
Filed March 19, 1954  7 Sheets-Sheet 6

INVENTORS.
JOHN J. GOODRICH.
RICHARD C. ROETGER.
BY
ATTORNEYS.

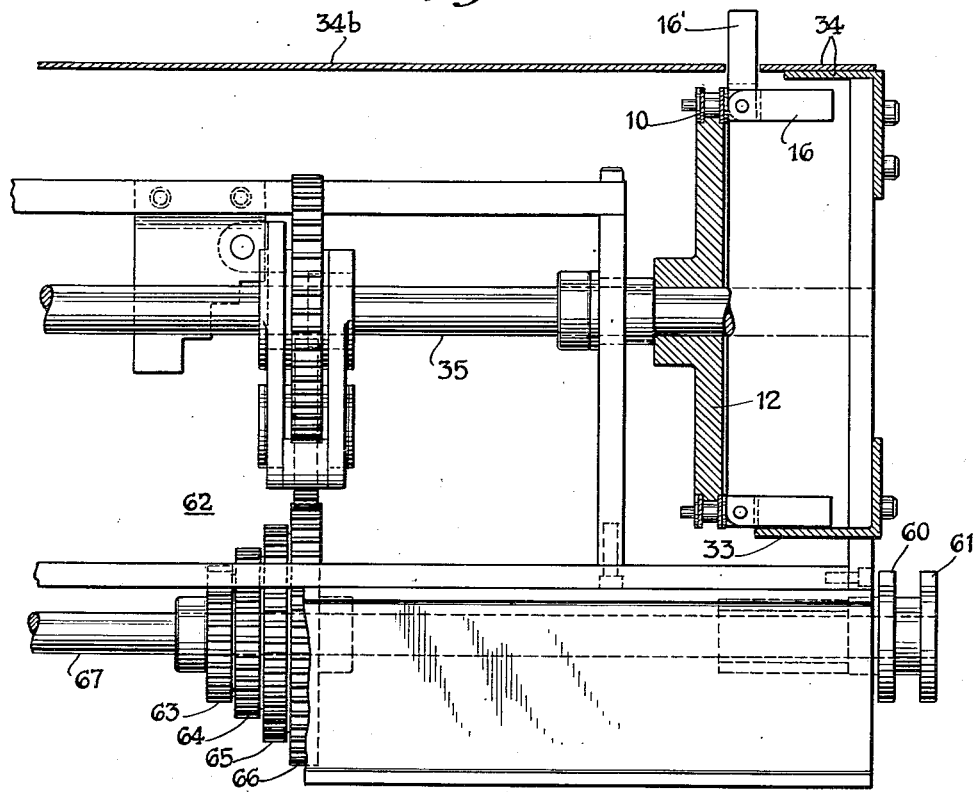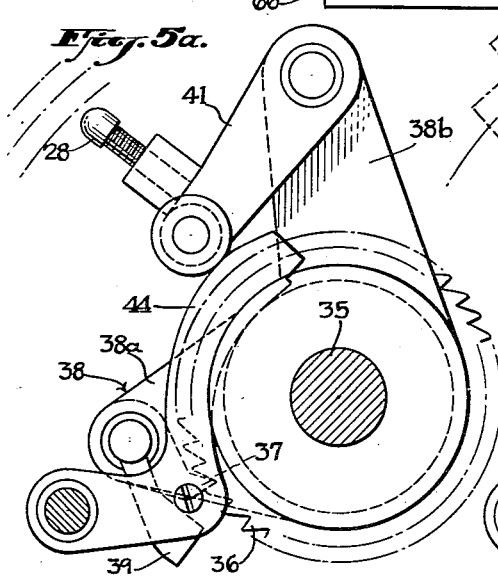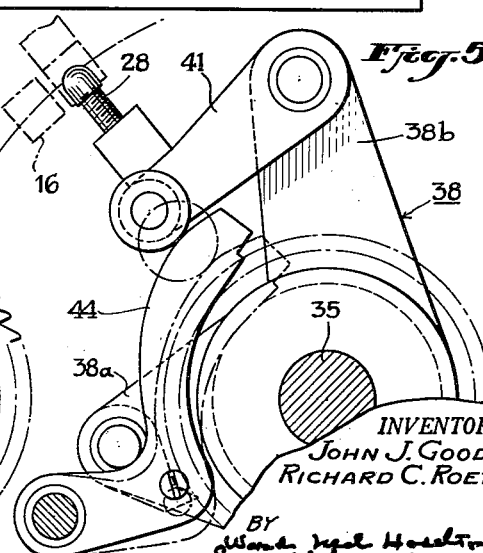

United States Patent Office 2,769,528
Patented Nov. 6, 1956

2,769,528

CONVEYOR MEANS HAVING PUSHER FINGERS RAISABLE AT SELECTABLE INTERVALS

John J. Goodrich and Richard C. Roetger, Pensacola, Fla., assignors to St. Regis Paper Company, New York, N. Y., a corporation of New York Application March 19, 1954, Serial No. 417,353

9 Claims. (Cl. 198—170)

This invention relates to conveyors and more particularly to conveyors for a succession of workpieces, such as bag tubes, wherein the interval between the workpieces can be easily adjusted without removal or exchange of the conveyor means.

With respect to the manufacture of sewn-end types of bags, particularly of the multiwall valved variety, such bags are formed from multi-ply bag tubes which are then valved and directed to a closure tape applicator which applies a continuous strip of closure tape to the opposite oncoming ends of the bag tubes. Thereafter the bag tubes having such end closure tapes applied thereto are directed to a sewing machine in order to sew through the tape across the top and bottom of each of the bags, thereby to complete same. The holes in the tape made by the needles may be covered by a filter cord applied in a conventional way. The closure tape thus is sewn by the sewing machines onto the bag ends in such a way that a continuous tape engages the oncoming series of valved bags. Consequently the bags at this stage and prior to separation thereof, are all connected by short strips of closure tape at the tops and the bottoms thereof. In order that there shall be as small wastage of the thread, filter cord and such closure tape as possible, it is important for the gaps between the bags to be as small as possible. Cutting devices are usually employed for: (a) either separating each pair of connected bags by a single cut across the tape at the gap between the two bags, that is, by severing the closure tape; or (b) chopping out a section of the closure tape. The latter may be employed if the amount of closure tape between the bags is of excessive length. It is, of course better practice for the gap to be as small as possible whereby a single cut can sever at both the bottoms and tops of the bags.

In view of the fact there are many widths of bag tubes, it is necessary to have suitable means for feeding each given width of bag tube into the tape applicator and sewing machine at a proper and accurate interval, the smaller the interval, the greater the saving in bag tape. The bag tubes may vary in width, for example, from 8 to 18 inches and each different bag tube width has an optimum interval for being fed to the sewing machines in order to achieve the best economy of closure tape.

It has been the practice in the past to achieve such optimum interval between the bag tubes by means of endless sprocket chain conveyor devices having pusher fingers rigidly (or substantially rigidly) secured to the sprocket chains thereof at a desired interval for each bag size. Such fingers, along either the upper or lower run of the sprocket chains, protrude into the path of the oncoming bag tubes and, at the proper interval, push same along a stationary floor into the tape applicator and sewing machine. It has been usual to employ a pair of such endless chains in side-by-side relation.

Thus for each size of bag tube it has been necessary in the past to have a separate pair of such conveyor chains in order to obtain the optimum interval. This has proven extraordinarily costly because each time a bag tube size is changed, the bag tube pusher mechanism must be stopped and the pair of pusher chains must be changed to another having the optimum interval for the new bag tube size. Some types of conveyor means of this class employed in the past have required many scores of such pairs of chains, one pair for each of the various sizes of bag tubes.

On of the objects of the present invention is to eliminate the need for changing the conveyor belt means every time the size of a bag tube is changed.

A further object of the invention is to provide novel conveyor means of this type wherein the bag tubes are fed at the optimum minimum interval to the devices for closing and sewing the tube ends.

Another object is to provide novel means for selecting the interval between pusher fingers upon the conveyor means.

The invention, in one aspect thereof, comprises endless belt conveyor means having pusher fingers which are adjustably positionable into or out of the path of the workpieces, such fingers being raisable at a selected interval by finger selector means to provide an optimum gap between such workpieces as they are pushed along a stationary floor.

The invention, in another aspect thereof, is constituted by a pair of endless sprocket chains, each situated in a substantially vertical plane and mounted in side-by-side spaced relationship. Each of the chains has a plurality of fingers pivotally mounted thereupon which are so constructed and arranged, particularly with respect to the upper run of the sprocket chain, normally to be in a horizontal attitude there. Means are provided for raising a plurality of pairs of fingers upon said chains, each pair comprising one finger upon one chain and an opposite finger on the other chain, the pairs being separated by a selected interval whereby the bags are pushed along a stationary floor and thus fed to the closure tape and sewing units at a desired accurate and minimum interval.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings:

Fig. 1 is a perspective schematic view of apparatus embodying one form of the invention;

Fig. 1a is a fragmentary view on an enlarged scale in perspective of a portion of one of the conveyor chains showing several of the pusher fingers pivotally secured thereto.

Fig. 2 is a side elevation of apparatus embodying the present invention, certain of the parts being broken away for purposes of illustration and clarity;

Fig. 3 is a plan view partly in section and with parts broken away of the apparatus shown in Fig. 2;

Fig. 4 is an end view of the apparatus shown in Fig. 2;

Fig. 5 is a side view of certain of the principal elements of an automatic selector device for raising the angularly shiftable fingers upon one of the sprocket chains at a selected interval;

Figs. 5a and 5b are fragmentary views of certain of the elements of Fig. 5 showing different operating positions of such elements;

Fig. 9 is a fragmentary end view of a portion of the apparatus shown in Fig. 2, particularly the lefthand region of the apparatus of the latter figure.

Figure 6:
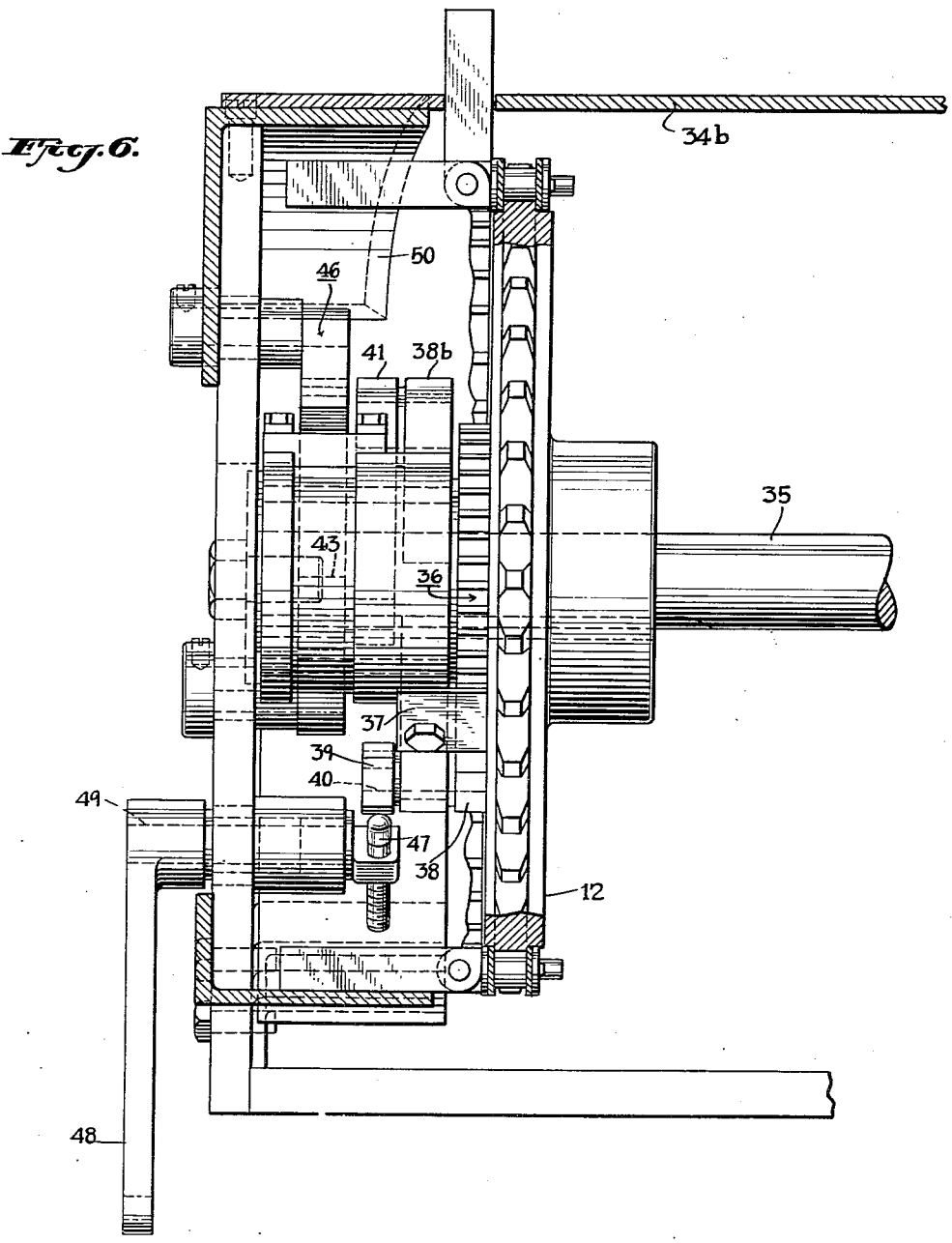
Fig. 6 is an end view of the apparatus shown in Fig. 5.

Referring to the drawings, with particular reference to Figs. 1, 1a, and 2–4, inclusive, the novel conveyor means comprises a pair of endless sprocket chains 10 and 11, each of which moves in a substantially vertical plane, the chains being mounted in parallel side-by-side relationship. Each of the sprocket chains 10 and 11 is mounted respectively upon its pair of sprocket wheels 12, 13 and 14, 15.

Sprocket chains 10 and 11 are analogous in construction and arrangement in that to each there is secured a plurality of angularly shiftable fingers, such fingers being designated at 16 for the sprocket chain 10, and 17 for the sprocket chain 11. It has been found desirable, in the embodiment shown, for the fingers 16 normally (when inactive) to extend outwardly with respect to the longitudinal path of the bags, and the fingers 17 to extend also outwardly but in an opposite direction as compared to the fingers 16.

The construction and operation of the invention with respect to fingers 16 only will now be described, it being understood that analogous construction and operation applies to fingers 17 on chain 11.

In Fig. 1a one manner for associating the fingers 16 with the sprocket chain 10 is shown, there being, for example, two such fingers 16 for each link of the chain. Each of the fingers 16 is provided with a bifurcated inner region 16a into which there extends a pivot knob 18 and with which the bifurcated portion is pivotally associated by means of a pivot 19.

Opposite upper portions (Fig. 1a) of the bifurcated region 16a, that is, the upper portions 16b thereof, are rounded for the purpose of facilitating the angular movement of each of the fingers to the vertical position 16'. However, the opposite lower portions 16c of such bifurcated region are squared and conformed in such a way that each acts as a limit-stop against any further downward angular motion beyond the horizontal position as shown in this figure. Consequently the fingers 16, as they move along the upper run of the belt, are normally held in a horizontal position by virtue of such limit-stop construction, except with respect to those fingers which are raised or erected by means to be described more fully hereinafter.

Each pivot knob 18 has secured thereto a link pin 18a which extends transversely through the chain 10 and protrudes from the opposite side thereof, as viewed in Fig. 1a. The protruding portion may be employed for securing same to the chain, for example, by a cotter pin which passes through a perforation therein.

Bags of a given width are directed in succession upon the conveyor means of Fig. 1 and there are pushed along the floor (34, 34a, 34b), by means of the pusher fingers (which protrude above such floor), into the paths of tape applicators 20 and 21 (shown schematically) which apply to the opposite ends of the bag tubes, the closure tapes 22 and 23, respecitvely. Adjacent to the tape applicators 20 and 21 are suitable sewing heads 24 and 25 which respectively sew upon the respective ends of the bag tubes the aforementioned closure tapes 22 and 23.

Thereafter the succession of bag tubes now connected at the opposite ends by the strips of closure tape are directed to suitable severing units 26 and 27 which preferably separate the bag tubes with a single cut although it is possible for them to chop out a portion of the tape. However, the present invention eliminates the need for chopping out such a portion.

Thereafter the bags are removed by any suitable conveyor means.

Broadly speaking, the means for erecting or raising selected of the angularly shiftable fingers are as follows, with respect to Fig. 1:

A finger tappet 28 is positioned preferably next to the sprocket wheel 12 at the rear of the conveyor means, such tappet being mounted and actuated in a manner which will appear more fully hereinafter whereby it is capable of thrusting outwardly from the position shown in Fig. 1 and simultaneously shifting angularly to shift one of the fingers 90° with respect to its respective sprocket link. When such finger reaches the upper run of the chain it will be vertical. The finger-raising tappet 28 is under the influence of a switch device 29 having a yieldably mounted finger 30 which is positioned in the path of the oncoming vertical fingers. Each time such a finger passes the arm 30 the latter yields and actuates the switch 29 and in turn actuates the finger-raising tappet 28 via a unit illustrated schematically at 31.

The switch means 29 can be adjusted in position lengthwise of the upper run of the chain 10 and hence the distance between: (a) the point of contact of the arm 30 with one of the raised fingers, and (b) the point of contact of the tappet 28 with the finger which it engages, is the selected interval at which all of the pusher fingers thereafter will be raised. Thus in order to select the desired interval, adjust the position of the switching means 29 longitudinally of its respective chain, in accordance with such distance.

In order to insure that all of the raised pusher fingers shall return to their normal position in alignment with their respective transverse link pins (18a), a cam 32 is provided at the righthand extremity of the sprocket chain 10, it being understood that an analogous cam is provided for the sprocket chain 11.

For the purpose of preventing the angularly shiftable fingers 16 from falling to a vertical position when on the lower run of the chain, a floor strip 33 is provided along the lower run thereof which, at the lefthand extremity, as viewed in Fig. 1, has an arcuate upwardly extending portion 33a which maintains the fingers in a desired attitude in alignment with their respective link pins (18a) whereby selected ones of such fingers are in proper attitude for engagement by the tappet 28.

Furthermore, for the purpose of providing means for maintaining each "raised" finger in a vertical position along the upper run of the chain, a stationary longitudinally extending side strip 34 is provided adjacent sprocket chain 10 which side strip is positioned slightly above the horizontally disposed fingers 16 (Fig. 4) but which is arranged in such a way that it prevents the falling of the erected or vertical fingers. An analogous side strip 34a is provided for the chain 11. Such chains 10 and 11 along the upper runs thereof ride upon their respective horizontal rail 10a, 11a (Fig. 4).

Interposed between the longitudinally extending side strips 34 and 34a is a longitudinally extending stationary center strip 34b which together with such side strips serves as a stationary floor for supporting the series of oncoming bag tubes. The raised pusher fingers thus slide the bag tubes over such floor. The stationary nature of such floor insures that each bag tube will be engaged along its rear edge by two opposite pusher fingers.

The finger-erecting and interval-selector means will now be described in detail, reference being had particularly to Figs. 1 and 5. The above-mentioned finger-raising tappet 28 is movable angularly a preselected number of degrees about the axis of a shaft 35 and simultaneously is movable radially outwardly from such axis. The angular movement of such tappet is effected by means of a ratchet and pawl mechanism, to appear below, and the radial outward movement is effected by means of a cam device. Such ratchet, pawl and cam means are described as follows:

A ratchet 36 is splined to the shaft 35 of the sprocket wheels 12, 14, such ratchet being positioned for cooperation with a pawl 37 which is pivotally mounted upon a bell crank lever 38 which in turn is angularly shiftable upon the aforementioned main shaft 35. The bell crank lever 38 comprises a pair of arms 38a and 38b (Fig. 5) which are 90° removed from one another. The first of these arms (38a) is the lowermost thereof, as viewed in Fig. 5, and pivotally supports the aforementioned pawl 37. Normally such pawl is held out of engagement with the ratchet 36 by means of a small weight 39 which is secured to a pivot shaft 40 to which also is secured the pawl 37.

To the other arm 38b of the bell crank lever 38 there is secured a cam follower arm 41, the latter being pivotally mounted to such arm 38b by means of a pivot 42. It is to the cam follower arm 41 that the aforementioned finger-raising tappet 28 is secured, the latter being axially adjustable with respect to the arm by any suitable means. A cam follower roller 43 is also mounted upon the follower arm 41 for the purpose of cooperating with a cam 44, the latter effecting the radial outward motion of the tappet 28 in response to relative movement of the roller 43 and the cam 44.

Such cam 44 is pivotally mounted at 45 at one extremity thereof, namely, the lower extremity (Fig. 5). The opposite extremity, for a reason to appear more fully hereinafter, is releasably held by a latch mechanism 46.

The pivotal mounting 45 for the lower extremity of the cam 44 is upon the frame of the apparatus and thus is not shiftable.

The pawl 37 is, as aforementioned, normally held out of engagement with the ratchet 36 by said weight 39 but can be urged into engagement therewith by means of a trigger rod 47 which, in the form shown in Fig. 5, is mounted upon a Y-shaped arm 48, the latter in turn being pivoted at 49 to the frame of the apparatus. Trigger rod 47 is positioned for engaging weight 39 and thus communicates torque to pawl 37 via such weight member and the common pivot shaft 40.

Such Y-shaped arm 48, when angularly shifted counterclockwise (Fig. 5), will, in effect, pull the trigger of the finger-raising device as follows:

The trigger rod 47 will engage the small weight 39 and shift same counterclockwise whereby the pawl 37 will be thrust into engagement with the ratchet 36 (which rotates continuously in a clockwise direction) in such a way that the pawl 37 and its arm 38 are entrained thereby and shifted angularly therewith over a preselected number of degrees as will appear herebelow. Thus immediately upon engagement of the pawl 37 and the ratchet 36 a torque will be applied to the bell crank lever 38 and the arm 41 (upon which the finger-raising tappet is mounted) will be shifted clockwise, together with the cam follower 43, the latter moving over the surface of the cam 44 thereby urging the tappet radially outwardly simultaneously while it is being moved angularly in a clockwise direction. Thus the tappet will engage a single angularly shifting finger 16, the latter moving with the sprocket wheel 12 thereby urging such finger outwardly to a position wherein a stationary cam 50 can complete the raising thereof, otherwise such finger will remain in alignment with its pivot pin 18a and thus will be horizontal as it moves along the upper run of the chain.

When the cam follower 43 has reached the full extent of the angular movement, which may be, for example, about 50–60° during which time it is under the influence of the cam 44, suitable means are provided for disengaging the pawl 37 from the ratchet 36, thereby permitting the cam follower 43 to return to its original position as shown in Fig. 5. Such means comprise a pin 51 which is in the path of movement of the small weight 39 and which is engaged thereby when the desired extent of angular movement of the bell crank lever 38 has occurred.

In order to insure that the tappet 28 will not interfere with the oncoming chain fingers after it has reached its outermost radial position at the peak of its angular movement, means are provided for permitting the cam 44 to move radially inwardly in response to the opening or releasing of the aforementioned latch means 46. Otherwise a free return of the tappet to its primary position would be hampered and the danger would exist of raising a series of adjacent consecutive fingers. Consequently the latch means 46 engages the cam 44 up until the time that it is desired for the cam follower to commence its return to its original position of Fig. 5, whereupon a suitable pin, for example, the same pin upon which is mounted the cam follower 43, engages a latch arm 51 (which restrains angular movement of the cam 44 within the limits 52, 53 of a notch 54) whereby such latch arm 51 is disengaged from the cam 44 thereby permitting the latter cam to move radially inwardly toward the center of the shaft 35 and further permitting the cam follower 43 to move further inwardly than it otherwise would be able to do. Consequently the finger-raising tappet 28 is moved radially inwardly an adequate amount to prevent its interference with any oncoming fingers 16 during its return trip to its original position of Fig. 5.

When the cam follower 43 has returned to its original position, as shown in Fig. 5, it engages a crook 44a in the cam 44 and urges the latter counterclockwise from its inner position wherein it is unlatched, to its operating position wherein it is latched by the latching means 46, as shown in this figure.

Two types of means are shown for actuating the Y-shaped arm 48 and hence the trigger rod 47. The first of such means is electrically actuated under the influence of the aforementioned microswitch 29 and the second of these is mechanically actuated by suitable cams which are under the influence of a change gear, there being a separate change gear for each size of bag or each bag tube width.

Figure 7:
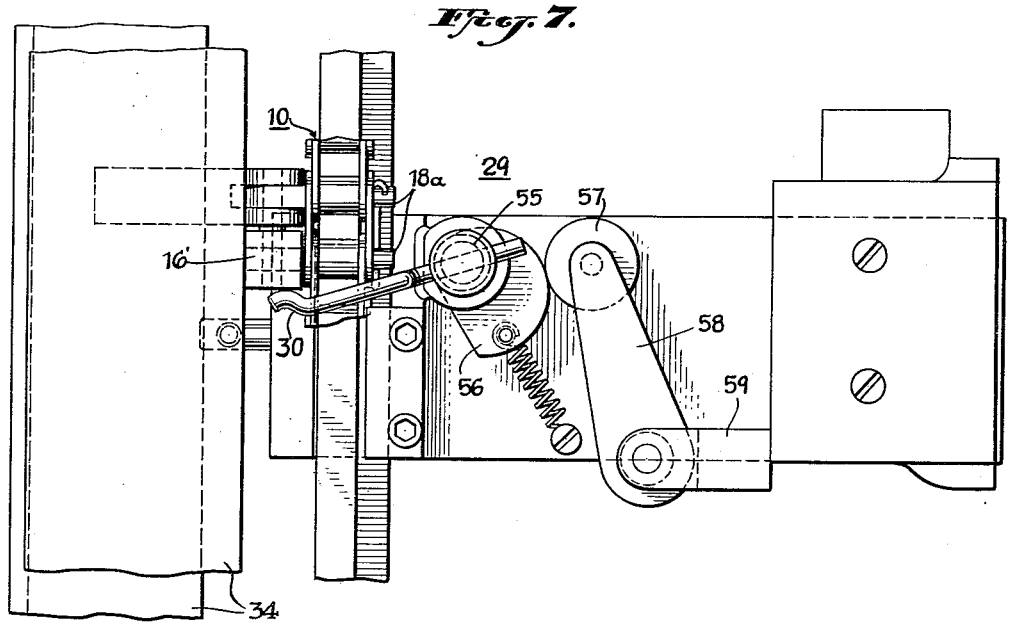
Fig. 7 is a plan view of switch means for cooperating with the conveyor means for the purpose of actuating the pusher finger erecting means at a selected interval.
Figure 8:
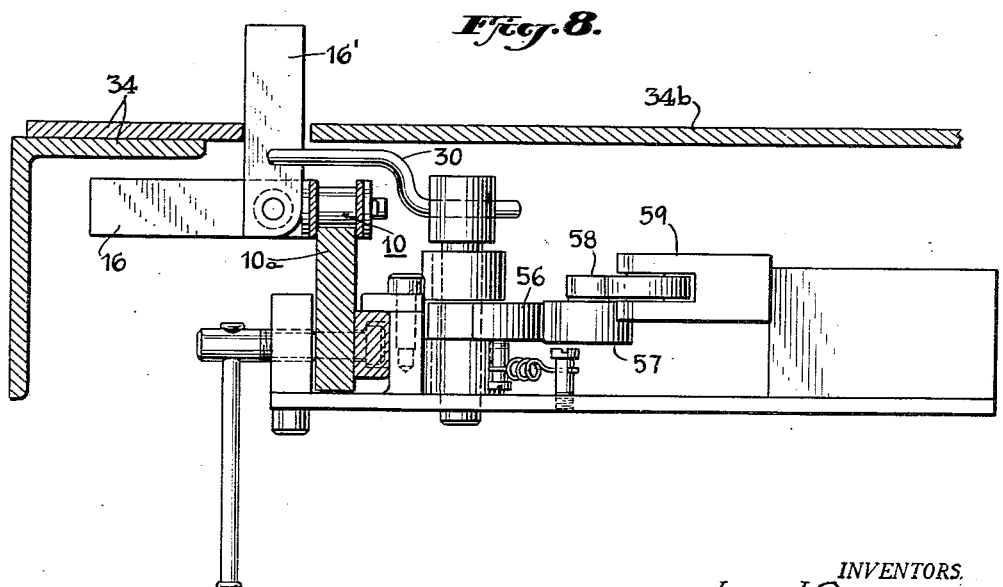
Fig. 8 is an end view of the switching means shown in Fig. 7.

Referring to Figs. 7 and 8, the microswitch 29 is shown in detail, together with the microswitch arm 30. In the form shown, the arm 30 is pivotally mounted at 55 and is connected with a cam 56 which engages a cam follower 57, the latter being secured to a microswitch arm 58 of a microswitch 59.

The microswitch 59 is operatively connected to a suitable solenoid (not shown) for actuating the trigger rod 47. The microswitch means 29, as aforementioned, can be positioned at any desired point along the upper run of the sprocket chain 10, it being understood that an analogous switch means is employed for the opposite chain 11. The normal operating procedure is first to adjust the microswitch to a desired position, the measurement of this position being with relation to a norm point, that is, the point of contact of the tappet 28 with a pusher finger. From such norm point is measured the distance to the position of the microswitch.

The operation of the device can be initiated by manually raising one of the chain fingers which will move up to and past the microswitch arm 30 and actuate same, thereby energizing such aforementioned solenoid which will in turn actuate the trigger 47. Thus there will be immediately operated the finger-raising device, which will raise a finger at a desired interval with respect to the finger first raised. The process thereafter will repeat itself automatically.

The alternative construction (mechanical) is shown in Figs. 2 and 9 and comprises a pair of cams 60 and 61. These cams are for the purposes of first pulling the trigger, that is, angularly shifting the trigger 47 via the Y-shaped arm 48, and secondly, for returning the trigger to its original position. The cams 60 and 61 are turned by torque from the main sprocket shaft 35 through the intermediary of any selected one of a group of change gears 62, there being, for example, four such gears shown 63–66, inclusive. The change gear selected has a number of teeth corresponding to the desired interval between the raised pusher fingers. It is not necessary to remove any one of the four change gears 63–66. If it is anticipated that, for example, four bag widths will be employed during a given period, the change gears for those particular bag widths can be mounted upon a shaft 67 for such change gears and one of such gears may be selected for operative and drivable interconnection with such shaft 35, for example, by a suitable chain or belt connection.

Although only a single embodiment of the invention has been illustrated and described in detail, it is to be expressly understood that the invention is not limited thereto. For example, the invention may be employed for moving any suitable workpiece other than flat bag tubes where it is desired to control accurately the interval between such workpieces and to adjust same without the need for changing the conveyor chains. Various changes also may be made in the design and arrangement of the parts illustrated as will now be apparent to those skilled in the art. For a definition of the limits of the invention reference will be had primarily to the appended claims.

What is claimed is:

1. In apparatus of the class described, endless belt means; a pair of series of pusher fingers mounted upon said belt means; each of such series comprising a plurality of pusher fingers, each finger being shiftable from a neutral position wherein it is out of the path of workpieces to be pushed, into a pusher position, wherein it protrudes into the path of such workpieces, finger-raising means for urging into pusher positions pairs of such fingers, each pair comprising one finger in one such series and another finger in the other series; and means for actuating said finger-raising means at a preselected interval in response to the moving of a raised finger past a preselected norm station.

2. In apparatus of the class described, endless belt means; and a pair of series of pusher fingers mounted upon said belt means; each of such series comprising a plurality of pusher fingers, each finger being shiftable from a neutral position wherein it is out of the path of workpieces to be pushed, into a pusher position, wherein it protrudes into the path of such workpieces, finger-raising means for urging into pusher positions pairs of such fingers, each pair including fingers on both of said series; and adjustable means for actuating said finger-raising means at a selected adjustable interval, such adjustable means including inter alia switch means actuatable in response to the moving of a raised finger past a norm station, such norm station being adjustable in position relative to said finger raising means thereby to adjust the interval between raised fingers.

3. In apparatus of the class described, endless belt means, a plurality of fingers pivotally secured to such endless belt means, means for holding said fingers normally in a substantially horizontal attitude with respect to the upper run of such endless belt means, said fingers being angularly shiftable to a vertical position with respect to at least one of the runs of such endless belt means, finger-raising means, and means responsive to the movement of a raised finger past a selected station for actuating said finger-raising means.

4. In apparatus of the class described, endless belt means mounted upon a pair of wheels, a plurality of fingers pivotally secured to said endless belt and so constructed and arranged that upon the upper run thereof they are normally in a horizontal attitude but any of them are selectively angularly movable to a vertical position, finger-raising means, including a tappet, mounted for angular movement with and radial movement with respect to one of such wheels, and means responsive to the movement of one of such fingers in a vertical position past a preselected station along such endless belt means for actuating said finger-raising tappet.

5. In apparatus of the class described, a shaft; a tappet finger; primary means for mounting said finger for angular movement about the axis of such shaft; secondary means for mounting said finger for movement outwardly relative to the axis of said shaft; said outward movement occurring in response to said angular movement; power means for so angularly shifting said primary means; means for selectively engaging and disengaging said primary means with said power means, a cam member, said secondary means including a pivoted arm which coacts with said cam member for so shifting the finger member outwardly; latch means for releasably holding said cam member, the latter being constructed and arranged to shift inwardly toward the axis of such shaft in response to the release of such latch means; and means for releasing said latch means in response to the movement of said tappet finger to a preselected position with respect to said cam member.

6. Apparatus in accordance with claim 5 including: means for restoring said cam member to its latched position with respect to said latch means, such means including an element upon said cam member for reacting with said pivoted arm in response to the movement of the latter to the extremity of one of the limits of its angular motion.

7. In apparatus of the class described, a floor member for supporting workpieces to be pushed along a selected path; endless belt means mounted for movement with a portion thereof substantially parallel to such floor member; a plurality of pusher fingers positioned in succession along such endless belt means; means for mounting said pusher fingers for movement relative to said floor member between active and inactive positions, a finger protruding into the path of the workpieces in the former position and being retracted therefrom in the latter; means for urging any selected finger from its inactive to its active position; an actuator device for said finger urging means; and means responsive to the movement of a finger in an active position past such actuator device located at a selected station for actuating said finger urging means.

8. Apparatus in accordance with claim 7 wherein said actuator device is adjustable in position thereby to adjust the spaced relationship between it and said finger urging means, whereby the interval between said active positioned pusher fingers is adjustable.

9. In apparatus of the class described, a floor member having a slot; endless belt means including a sprocket chain passing over sprockets at the opposite ends thereof, one of the runs of the chain being disposed beneath said floor member, adjacent thereto and along said slot; a support for said run which extends along and beneath such slot; said sprocket chain having a plurality of links and a plurality of transversely disposed link pins relatively closely spaced, each link having two such pins passing therethrough, each of such link pins having secured thereto a pivot knob; and a plurality of push fingers secured one to each of such pivot knobs, there thus being one pusher finger pivotally secured to each of such link pin, such pusher fingers normally being substantially in alignment with their respective link pins and thereby being in a substantially horizontal attitude with respect to the upper run of such sprocket chain, said pusher fingers being angularly shiftable to a vertical position with respect to such upper run of the sprocket chain; finger raising means; and means responsive to the movement of a raised finger past a selected station for actuating said finger raising means.

References Cited in the file of this patent

UNITED STATES PATENTS

| | | |
|---|---|---|
| 827,738 | Linderman | Aug. 7, 1906 |
| 1,655,580 | Stuedeman | Jan. 10, 1928 |
| 1,915,765 | Sharkey | June 27, 1933 |
| 2,450,106 | Bemis et al. | Sept. 28, 1948 |
| 2,480,253 | Malhiot | Aug. 30, 1949 |